Figure 1:
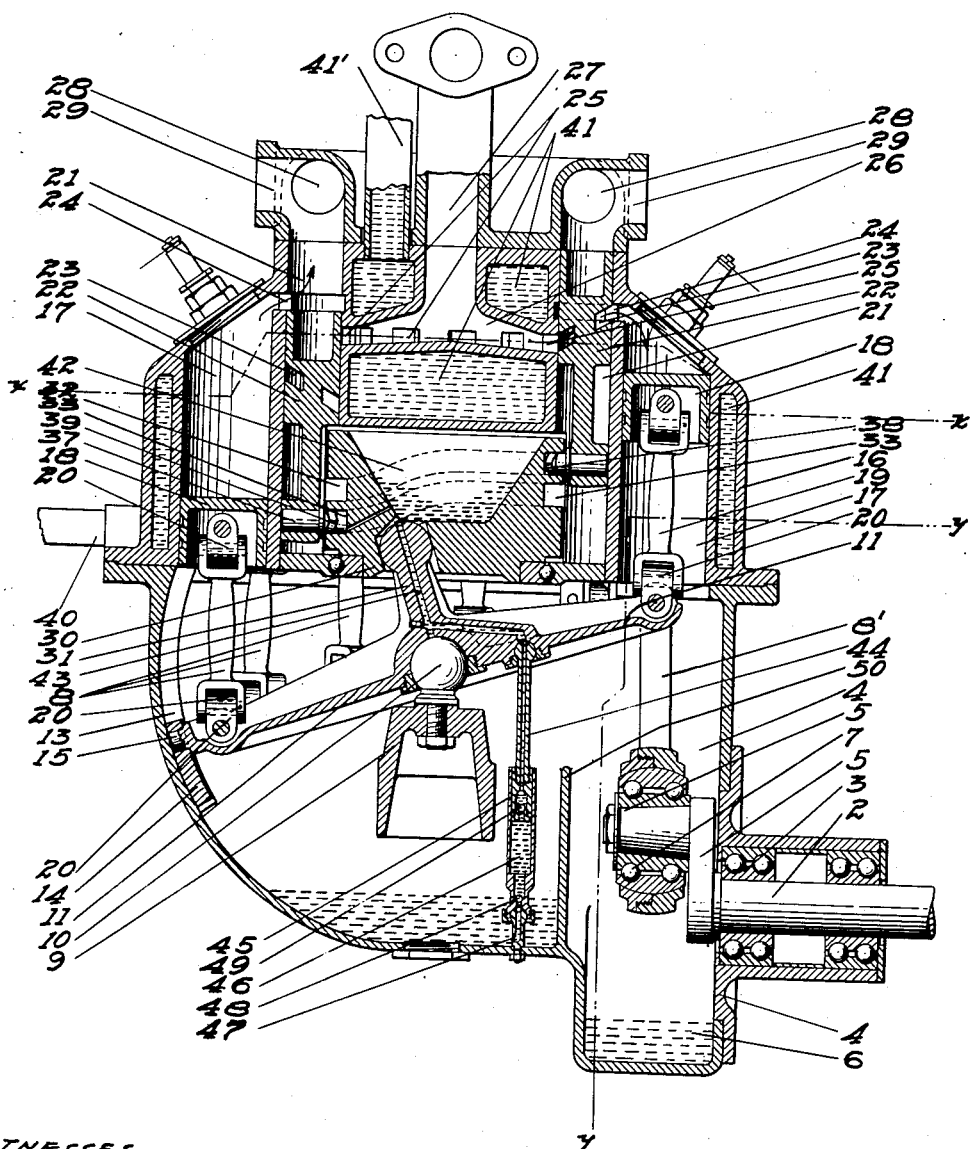

E. G. STAUDE.
INTERNAL COMBUSTION ENGINE.
APPLICATION FILED APR. 12, 1915.

1,370,927.

Patented Mar. 8, 1921.

3 SHEETS—SHEET 1.

WITNESSES
M. R. McInnis
E. A. Paul

INVENTOR
EDWIN G. STAUDE
BY
Paul & Paul
ATTORNEYS

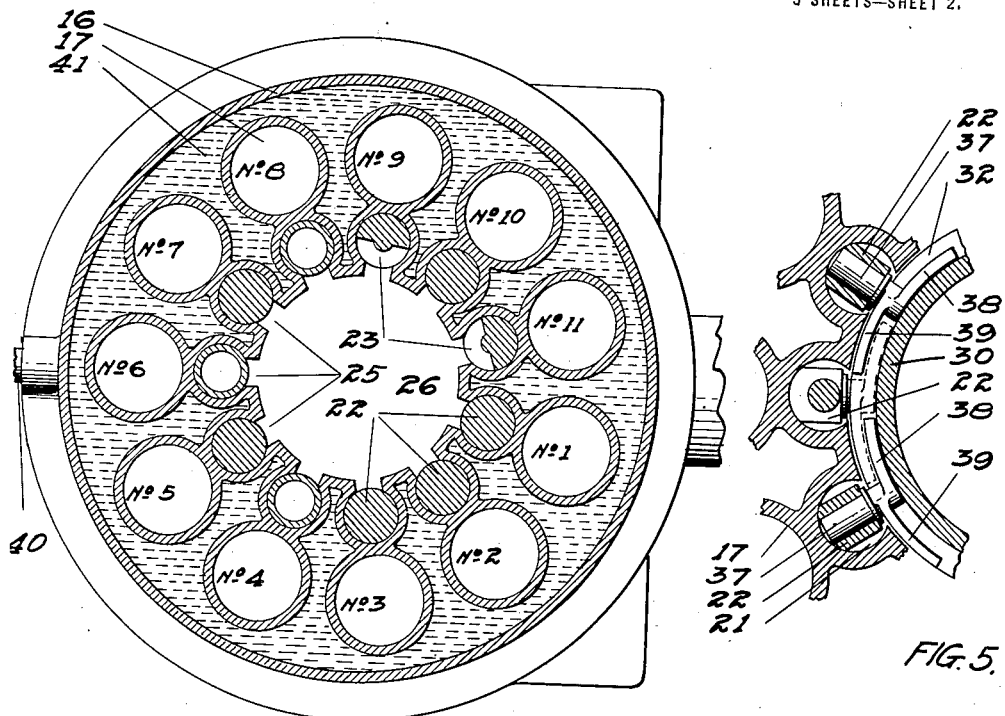
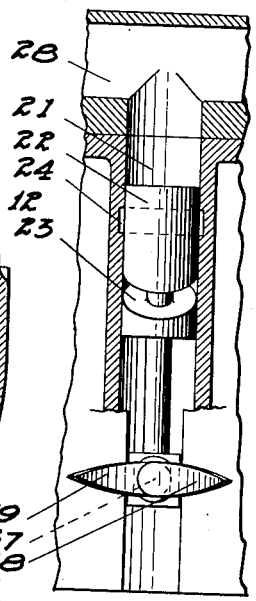
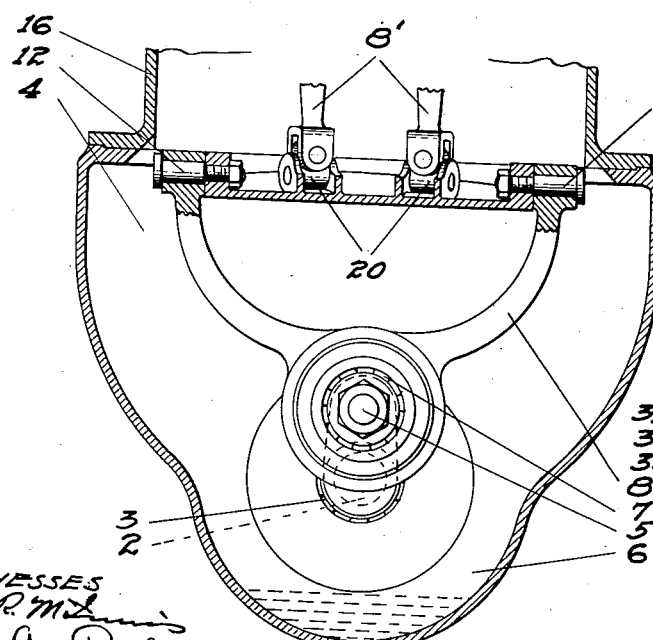

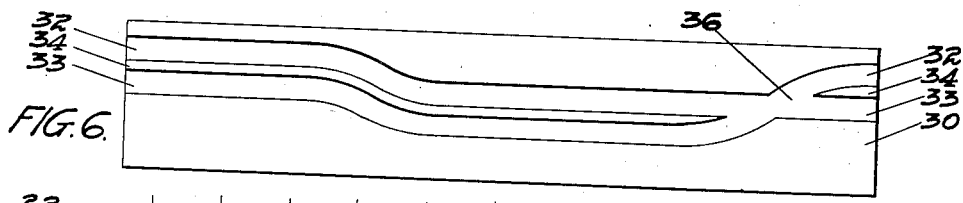
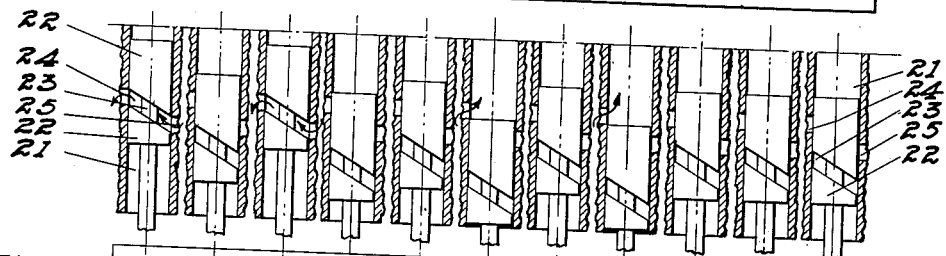
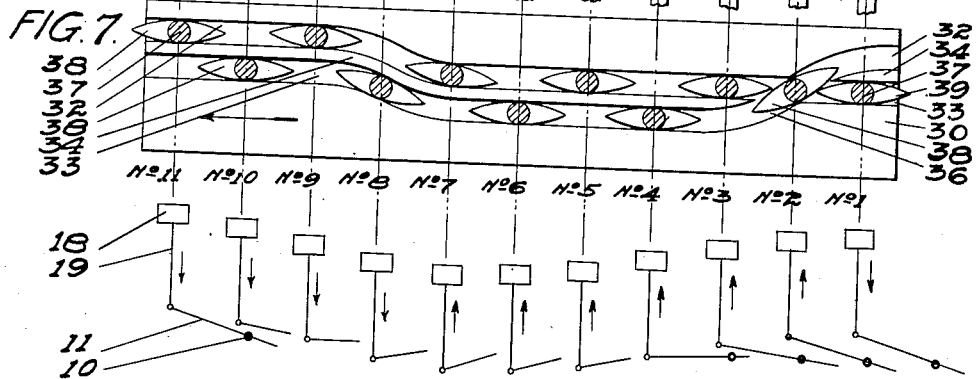
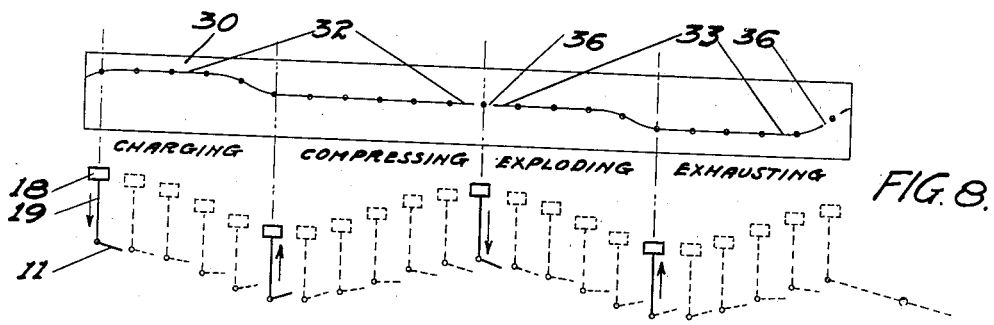
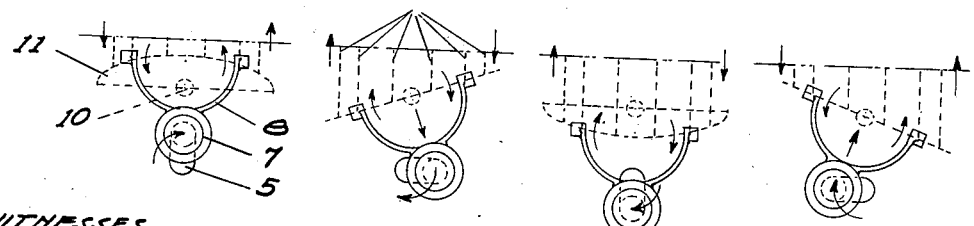

UNITED STATES PATENT OFFICE.

EDWIN GUSTAVE STAUDE, OF MINNEAPOLIS, MINNESOTA.

INTERNAL-COMBUSTION ENGINE.

1,370,927. Specification of Letters Patent. Patented Mar. 8, 1921.

Application filed April 12, 1915. Serial No. 20,715.

*To all whom it may concern:*

Be it known that I, EDWIN G. STAUDE, a citizen of the United States, a resident of Minneapolis, county of Hennepin, State of Minnesota, have invented certain new and useful Improvements in Internal-Combustion Engines, of which the following is a specification.

The object of my invention is to provide an internal combustion engine which will be compact and inexpensive in construction and will exert a practically continuous torque on the driving shaft.

A further object is to provide a plurality of valves operating noiselessly, but one valve being required for each cylinder.

A further object is to provide an internal combustion engine having valves for the inlet and exhaust ports which are balanced to operate freely regardless of the pressure in the explosion chamber.

A further object is to provide an engine having a plurality of cylinders, all of which are an equal distance from the carbureter and have the same gas travel.

A further object is to provide an engine in which the usual expensive construction of crank shaft is avoided.

A further object is to provide an improved system of lubrication and an engine in which the explosion and valve cylinders are of easy access and can be readily machined to the required diameter.

The invention consists generally in various constructions and combinations, all as hereinafter described and particularly pointed out in the claims.

In the accompanying drawings forming part of this specification,

Figure 1 is a vertical sectional view through an internal combustion engine embodying my invention, Fig. 2 is a horizontal sectional view through the explosion and valve cylinders of the engine, taken on the line $x$—$x$ of Fig. 1, Fig. 3 is a vertical sectional view, taken on the line $y$—$y$ of Fig. 1, showing the means for attaching the engine crank shaft to the pistons of the cylinders, Fig. 4 is a detail sectional view of one of the cylinder valves for controlling the flow of gas to the cylinder, Fig. 5 is a horizontal sectional view through some of the cylinder valves, showing their connection with the operating block, Fig. 6 is a detail view, illustrating the cam grooves formed in the operating block, Fig. 7 is a view illustrating the eleven cylinders of the engine and their valves in their proper relative position, Fig. 8 is a diagrammatic view, illustrating the cycle of operation of one cylinder.

Fig. 9 is a diagrammatic view, showing the manner of transmitting the movement of the cylinder pistons to the crank shaft.

In the drawing, 2 represents a crank shaft, having a bearing 3 in a casing 4. This shaft is provided with but a single crank 5 for connection with all the cylinder pistons of the engine, and thereby the expense of manufacturing the crank shaft is considerably reduced. A well 6 is formed in the bottom of the casing, adapted to contain a supply of lubricating oil, in which the bearing 7 of the crank on the yoke 8 is properly lubricated. Within the casing is a support 9 having a spherical bearing 10 mounted thereon for a rocking plate 11 that is centrally mounted on said bearing and is free to rock or tilt in any direction. This plate has pivotal connections at 12 with the arms 8' so that, as the plate is rocked on its support, movement will be transmitted through the arms to revolve the crank shaft. A guide 13 is mounted on the inner side wall of the casing and a shoe 14 is pivotally connected at 15 with the rocking plate and is free to slide vertically in said guide to allow oscillation of the plate but prevent its rotation on its bearing. Above the casing 4 is a cylinder casing 16 provided with a series, preferably eleven, of upright cylinders 17 having pistons 18 connected by rods 19 with the top of the rocking plate 11 by means of couplings 20 which allow freedom of movement of the rocking plate with respect to the connecting rods. Adjacent to these cylinders I provide a corresponding number of valve cylinders 21 containing slide valves 22 having obliquely arranged annular grooves 23 formed therein, adapted to register with ports 24 in the upper walls of the cylinders and with corresponding ports 25 in the walls of a central chamber 26 which communicates through a passage 27 with a carbureter, not shown. An annular chamber 28 is provided in the top of the cylinder casing encircling the carbureter passage and provided with exhaust ports 29 through which the burned gases are discharged from the piston cylinder when the valve controlling the admission of gas to that cylinder is in the position illustrated at the left hand of Fig. 1. As here shown, the piston is about to begin its scavenging to force the burned gases out of the cylinder into the exhaust passage and to the open air. There are as many of the valves as there are cylinders and I prefer to provide eleven in all, grouped in a circle within the circle described by the piston cylinders. A block 30 is centrally mounted in the lower portion of the cylinder casing and a stud 31, centrally mounted on the rocking plate, has an eccentric bearing in the block 30 so that when the plate is rocked or oscillated, the block will be correspondingly revolved. This block is provided in its outer face with two annular grooves 32 and 33, arranged to form cam tracks in the face of the block, said grooves being separated by a web 34 and intersecting one another at 36, where a gap is provided in the web 34. The lower portions of the cylinder valves have pins 37 mounted therein, provided with shoes composed of sections 38 and 39, curved slightly and out of alinement with one another on opposite sides of the axis of the pins 37, as indicated in Fig. 5. These shoes are adapted to slide in the grooves 32 and 33 and their position in the grooves represents the different positions of the valves and the pistons of the engine. The cam surfaces in the grooves are so arranged that as the block revolves, the shoes will be actuated to reciprocate the cylinder valves, moving them in rotation to the successive positions for charging, compressing, exploding and exhausting.

The charging position is indicated in Fig. 7 for the cylinders 11 and 9 and the valves 22 of these cylinders are open to the intake chamber 26. The compressing position is indicated for the cylinders 7, 5 and 3, and their valves 22 are closed. The exploding position is indicated for cylinders 1, 10, and 8 and their valves 22 are closed. The exhausting position is indicated for the cylinders 6 and 4 and their valves 22 are open to the exhaust port 28. The shoe of the valve 22 for the cylinder 2 is just leaving the groove 33 and crossing the gap 36 into the groove 32 and the piston of the cylinder 2 is at the end of the exhaust stroke and will be on the suction stroke when the shoe of the valve 22 enters the groove 22 and said cylinder 2 and its valve 22 will then correspond in their relation to the cylinder 11. The shoes of these valves slide in the annular grooves, passing first along the charging part of the groove 32 and then the compression portion thereof, jumping the gap 36 horizontally, and thence to the exploding section of the groove 33 and the exhausting portion thereof and passing therefrom through the gap 36 in the web 34 and across at an angle into the groove 32 to a position above the web 34, where the charging step in the operation of the engine will be resumed, there being a sufficient gap or interval between the travel of the valve shoes to allow the shoe to pass from the groove 33 through the gap 36 into the groove 32 above the web 34. In this way the operation of the rocking plate 11 will be continuous and there will be no break or hiatus in the application of strain to the crank shaft.

In starting the engine with an uneven number of cylinders, an explosion takes place in cylinders 1, 3, 5, 7, 9 and 11 on the first revolution of the block 30, while on the second revolution the cylinders 2, 4, 6, 8, 10 and 1 will explode. Thus cylinder 1 has a complete cycle on two revolutions of the block 30.

In Fig. 8 the complete cycle of one cylinder is shown. The grooves in the block are shown as one continuous groove during the two revolutions of the block.

A pipe 40 leads to the chamber 41 adapted to contain a cooling fluid, and the pipe 41' leads from said chamber for circulation of said fluid. The block 30 has a recess 42 therein adapted to contain a lubricating fluid and a duct 43 is formed in the stud 31 and communicates with a telescoping pipe 44 that is mounted in a tube 45 having a chamber 46 provided with a port 47 leading to the lubricating oil in the lower part of the casing and having a valve 48 for normally closing the passage. A similar valve 49 is provided in the plunger in the lower end of the pipe 44. When this plunger is reciprocated, the oil is drawn into the chamber 46 and forced up through the duct into the recess 42, from whence it is distributed to the various bearings. The oil in the recess 42 flows down upon the bearing for the block 30 and from thence over the top of the plate 11 to the bearings of the connecting rods with the plate and downwardly through the duct 43 from the bearing 10. It is also distributed over the edge of the recess 42 into the valve cylinders and the operating means for the valves, insuring thorough lubrication thereof. I prefer to separate the bottom of the casing from the well 6 by a suitable partition 50.

It will be noted that all the valves in the cylinders are an equal distance from the carbureter, thereby insuring a uniform delivery of gas to the cylinders. The water chamber will not only serve to cool the cylinders, but will warm the manifold and heat the gas passing therethrough to the valves. The valves and pistons will all be substantially balanced and will operate freely, regardless of the pressure in the explosion cylinders. Each cylinder is provided with a compression chamber at the end thereof, so arranged that there will be no pockets where the burned gases may collect.

In Fig. 9 I have shown a complete revolution of the crank 5, as well as the complete rotating movement of the plate 11 and it will be noted that there is a continuous twisting motion or torsion to the crank from the plate 11, and thus the application of the power will be continuous throughout the stroke of the engine.

In various ways the details of construction herein shown and described may be modified and still be within the scope of my invention as set forth in the claims.

I claim as my invention:

1. The combination, with a casing, of a crank shaft mounted therein, a rocking member having a central bearing and a peripheral connection with said crank shaft, a plurality of cylinders, pistons therefor connected with said disk, valves for said pistons, and means actuated through the rocking of said disk for operating said valves.

2. The combination, with a casing, of a crank shaft mounted therein, a disk having a central bearing in said casing above said crank shaft, a group of cylinders arranged above said disk in the form of a circle, pistons therefor having pivotal connections with said disk, valves for said cylinders, a block encircled by said valves and cylinders and having cam connections with said valves for reciprocating them when said block is revolved, and said disk having a centrally arranged stud provided with an eccentric bearing in said block whereby the rocking of said disk will revolve said block.

3. An internal combustion engine comprising a casing, a rocking member mounted therein, a group of cylinders having their pistons operatively connected with said rocking member, a crank shaft connected with said member, a group of valves encircled by said cylinders and controlling the intake and exhaust of said cylinders, a revolving block encircled by said valves and having peripheral cam grooves therein, shoes mounted in said valves to fit into said grooves and slide therein when said block is revolved, said shoes passing from one groove to the other in the revolution of said block and said rocking member having an eccentric bearing in said block.

4. An internal combustion engine comprising a casing having a well for a lubricant in the lower portion thereof, a crank shaft, a rocking member supported above said well and operatively connected with said crank shaft, a series of cylinders arranged on the opposite side of said rocking member from said crank shaft, pistons for said cylinders connected with said member, valves for said cylinders, a revolving block operatively connected with said valves to reciprocate the same and having a chamber for a lubricant therein, said member having an eccentric bearing in said block and provided with a duct leading from said well to the chamber in said block, said chamber having ports leading therefrom and said member having means for forcing the oil through the duct therein from said well and through said chamber and ports.

In witness whereof, I have hereunto set my hand this 9th day of April, 1915.

EDWIN GUSTAVE STAUDE.

Witnesses:
GENEVIEVE E. SORENSEN,
EDWARD A. PAUL.